(12) United States Patent
Ko et al.

(10) Patent No.: US 10,295,870 B2
(45) Date of Patent: May 21, 2019

(54) ELECTRONIC DEVICE AND METHOD FOR OPERATING THEREOF

(71) Applicant: SAMSUNG ELECTRONICS CO., LTD., Suwon-si, Gyeonggi-do (KR)

(72) Inventors: Jeong-Won Ko, Seoul (KR); Joong-Hun Kwon, Seoul (KR); Chang-Hwan Kim, Seoul (KR); Sangdeuk Nam, Suwon-si (KR); Seung Wook Nam, Bucheon-si (KR); Myoung-Soo Park, Hwaseong-si (KR); Sunyoung Park, Seoul (KR); Kyungjun Lee, Suwon-si (KR); Dong Oh Lee, Seongnam-si (KR); Junwon Jung, Seoul (KR); Huichul Yang, Yongin-si (KR); Hyunyeul Lee, Seoul (KR); Soojin Jeong Lim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/631,270

(22) Filed: Jun. 23, 2017

(65) Prior Publication Data

US 2018/0052369 A1    Feb. 22, 2018

(30) Foreign Application Priority Data

Aug. 17, 2016  (KR) .......................... 10-2016-0104205

(51) Int. Cl.
*G06F 3/041*    (2006.01)
*G02F 1/1343*   (2006.01)
(Continued)

(52) U.S. Cl.
CPC ........ *G02F 1/134309* (2013.01); *G06F 1/263* (2013.01); *G06F 1/3212* (2013.01);
(Continued)

(58) Field of Classification Search
CPC .. G02F 1/134309; G06F 3/044; G06F 1/3265; G06F 3/0412; G06F 3/0416;
(Continued)

(56) References Cited

U.S. PATENT DOCUMENTS

2013/0154959 A1 *  6/2013  Lindsay ............... G06F 1/1694
                                                      345/173
2014/0306905 A1 * 10/2014  Kim .................... G06F 3/04886
                                                      345/173
(Continued)

FOREIGN PATENT DOCUMENTS

KR   10-2011-0008939    1/2011
KR   10-2015-0040246    4/2015

*Primary Examiner* — Adam R. Giesy
(74) *Attorney, Agent, or Firm* — Nixon & Vanderhye P.C.

(57) ABSTRACT

An electronic device and a method for operating thereof are provided. The electronic device includes a touch screen having a display region of a first ratio, and a processor operatively coupled with the touch screen, and configured to perform a set function in response to a preset first touch input that occurs on another region, where content is not displayed, of the display region in a state where the content of a second ratio is displayed on a partial region of the display region.

17 Claims, 13 Drawing Sheets

[703]    [704]

(51) Int. Cl.
- *G06F 1/3234* (2019.01)
- *G06F 3/044* (2006.01)
- *G06F 3/0485* (2013.01)
- *G06F 3/0488* (2013.01)
- *G09G 3/36* (2006.01)
- *G06F 1/26* (2006.01)
- *G06F 1/3212* (2019.01)
- *G06F 3/0481* (2013.01)
- *G09G 3/20* (2006.01)
- *G09G 5/14* (2006.01)
- *G09G 5/10* (2006.01)

(52) U.S. Cl.
CPC ............ *G06F 1/3265* (2013.01); *G06F 3/044* (2013.01); *G06F 3/0412* (2013.01); *G06F 3/0416* (2013.01); *G06F 3/0481* (2013.01); *G06F 3/0485* (2013.01); *G06F 3/0488* (2013.01); *G06F 3/04883* (2013.01); *G06F 3/04886* (2013.01); *G09G 3/20* (2013.01); *G09G 3/3611* (2013.01); *G09G 5/14* (2013.01); *G06F 2203/04803* (2013.01); *G09G 5/10* (2013.01); *G09G 2340/04* (2013.01); *G09G 2354/00* (2013.01); *Y02D 10/153* (2018.01); *Y02D 10/174* (2018.01)

(58) Field of Classification Search
CPC .. G06F 3/0485; G06F 3/0488; G06F 3/04886; G06F 3/04883; G06F 2203/04803; G09G 3/3611; G09G 5/10
See application file for complete search history.

(56) References Cited

U.S. PATENT DOCUMENTS

| | | | |
|---|---|---|---|
| 2014/0351748 A1* | 11/2014 | Xia | G06F 3/0481 715/798 |
| 2015/0067588 A1* | 3/2015 | Shim | G06F 3/0482 715/790 |
| 2015/0100914 A1 | 4/2015 | Guan | |

\* cited by examiner

ELECTRONIC DEVICE AND METHOD FOR OPERATING THEREOF

CROSS-REFERENCE TO RELATED APPLICATION

This application is based on and claims priority under 35 U.S.C. § 119 to a Korean Patent Application entitled "ELECTRONIC DEVICE AND METHOD FOR OPERATING THEREOF" filed in the Korean Intellectual Property Office on Aug. 17, 2016 and assigned Serial No. 10-2016-0104205, the contents of which are incorporated by reference herein in its entirety.

BACKGROUND

1. Field of the Disclosure

The present disclosure relates generally to an electronic device capable of, when an image is displayed in a partial region of a display, executing various functions using a region where an image is not displayed, and a method for operating thereof.

2. Description of Related Art

Electronic devices (e.g., mobile terminals, smartphones, etc.) can provide various functions. For example, the smartphones can provide an Internet connection function, a music or video play function, a photographing function, a navigation function, a messenger function, etc., in addition to a basic voice communication function.

In recent years, users who view videos using electronic devices are increasing. Attention is being increasingly paid to multimedia functions of the electronic devices. Owing to this, electronic devices having large screens are being developed. Meantime, the users are demanding slim and small-sized electronic devices.

In accordance with such users' demand, recently, electronic devices replacing physical keys with soft keys and increasing the sizes of displays are increasing. For example, electronic devices having displays of a ratio of 19:9 instead of the conventional displays of a ratio of 16:9 are increasing.

However, the majority of current contents have the ratio of 16:9. Due to this, when the 19:9 electronic device displays the 16:9 contents, an image is displayed in a partial region among a display region, so a region where the contents are not displayed can be generated. The electronic device just simply displays the content non-display region in black, and fails to utilize the content non-display region.

SUMMARY

Accordingly, various example embodiments of the present disclosure may provide an electronic device capable of performing various functions utilizing a region where content is not displayed, and a method for operating thereof.

According to various example embodiments of the present disclosure, an electronic device may include a touch screen having a display region of a first ratio, and a processor operatively coupled with the touch screen, and configured to perform a set function in response to a preset first touch input that occurs on another region of the display region where content is not displayed in a state where the content of a second ratio is displayed on a partial region of the display region of the first ratio.

According to various example embodiments of the present disclosure, a method for operating of an electronic device having a display region of a first ratio may include displaying a content of a second ratio on a partial region of the display region of the first ratio, determining whether a preset first touch input occurs in another region where content is not displayed among the display region, and performing a set function in response to the first touch input.

BRIEF DESCRIPTION OF THE DRAWINGS

The above and other aspects, features and attendant advantages of the present disclosure will become more apparent and readily appreciated from the following detailed description, taken in conjunction with the accompanying drawings, in which like reference numerals refer to like elements, and wherein.

DETAILED DESCRIPTION

Figure 1:
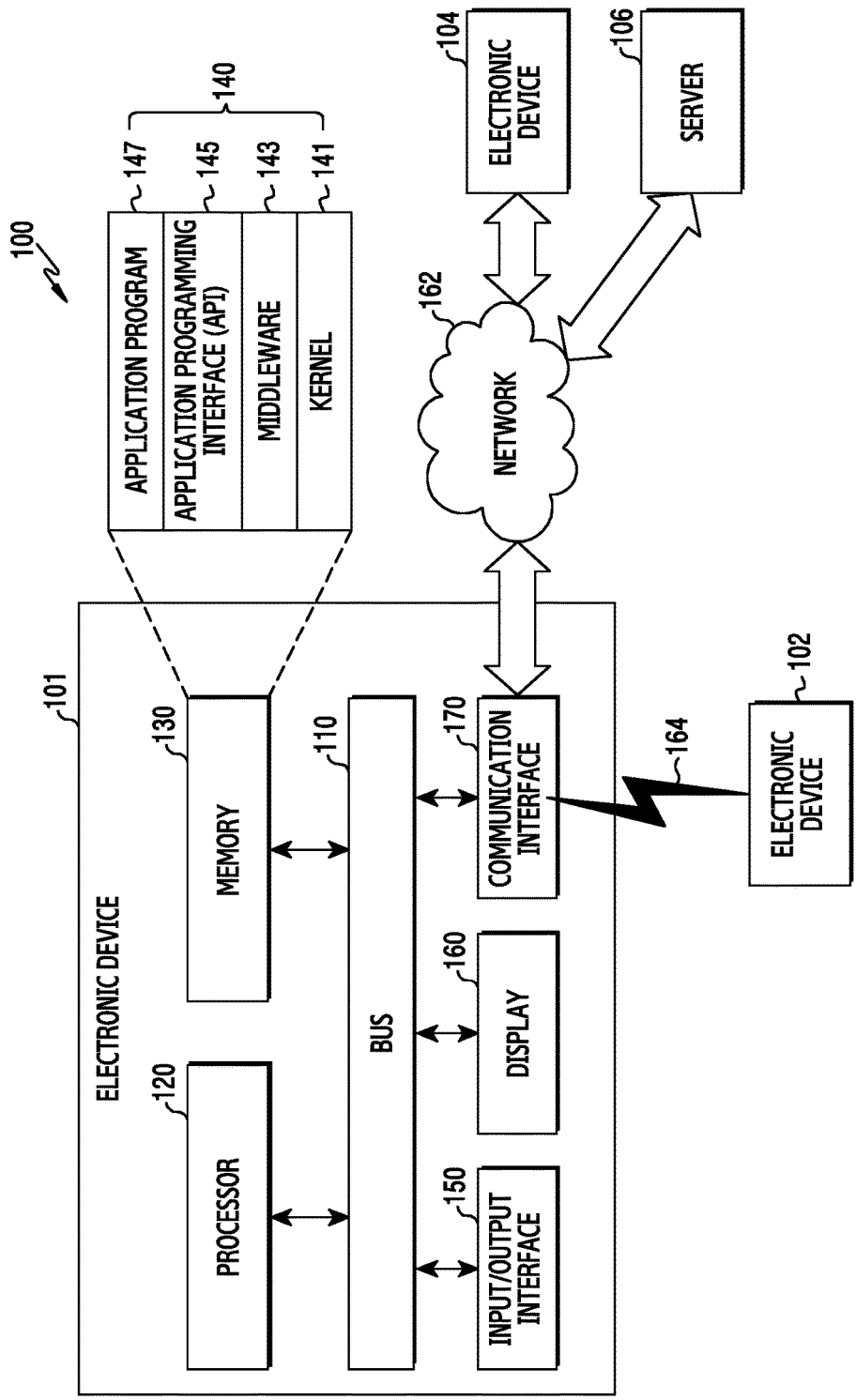
FIG. 1 is a diagram illustrating an electronic device within a network environment according to an example embodiment of the present disclosure.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only refer to "specifically designed to" by hardware. Alternatively, in some situations, the expression "apparatus configured to" may refer to a situation in which the apparatus "can" operate together with another apparatus or component. For example, the phrase "a processor configured (or set) to perform A, B, and C" may be, for example, and without limitation, a dedicated processor, a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a head-mounted-device (I-MD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, or the like, but is not limited thereto.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

FIG. 1 is a block diagram illustrating a network environment system (100) according to various example embodiments of the present disclosure.

Referring initially to FIG. 1, electronic devices 101, 102, 104 and/or a server 106 may be connected to each other via a network 162 and/or a wireless (e.g., short-range) communication 164. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may be provided without at least one of the components, or may include at least one additional component.

The bus 110 can include a circuit for connecting the components 120 through 170 and delivering communication signals (e.g., control messages or data) therebetween.

The processor 120 may include various processing circuitry, such as, for example, and without limitation one or more of a dedicated processor, a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170 may include various communication circuitry and, for example, can set a communication between the electronic device 101 and an external device (e.g., an electronic device 102, a second electronic device 104, or a server 106). For example, the communication interface 170 can communicate with the external device (e.g., the second external electronic device 104 or the server 106) over a network 162 through wireless communication or wired communication. The communication interface 170 may additionally communicate with an electronic device (e.g., the electronic device 102) using a short-range wireless communication connection 164.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, as shown by an element 164 of FIG. 1, at least one of Wireless Fidelity (WiFi), LiFi (light fidelity), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
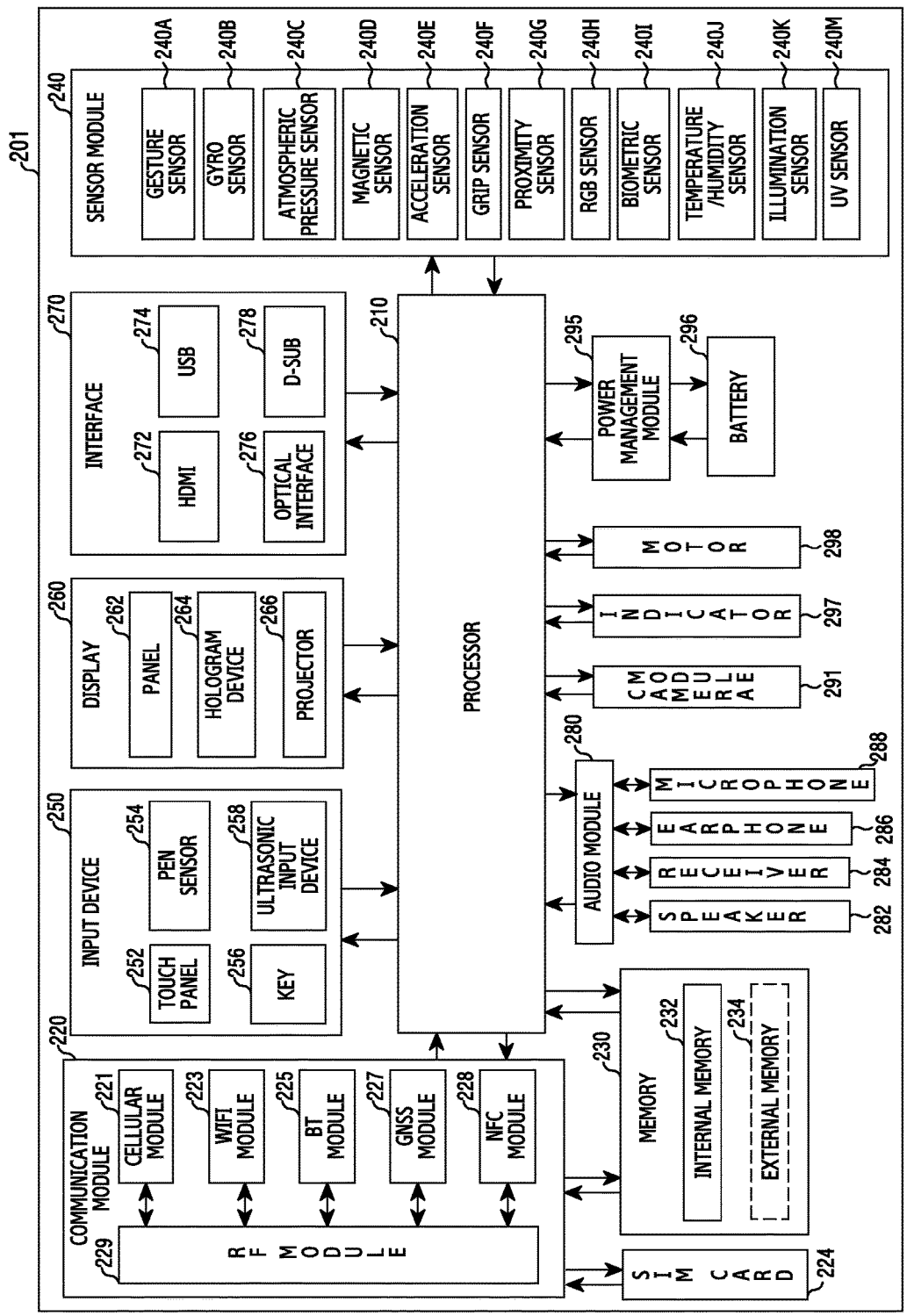
FIG. 2 is a block diagram illustrating an example electronic device according to an example embodiment of the present disclosure.

FIG. 2 is a block diagram illustrating an example electronic device 201 according to an example embodiment of the present disclosure.

The electronic device 201, for example, can include all or part of the above-described electronic device 101 of FIG. 1. The electronic device 201 may include one or more processors (e.g., an AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210, for example, may include various processing circuitry and can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components illustrated in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module.

The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red, Green, Blue (RGB) sensor), a biometric sensor 240I, a temperature/humidity sensor 240J, an illumination sensor 240K, and an Ultra Violet (UV) sensor 240M. Additionally or alternatively, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 may include various input circuitry, such as, for example, and without limitation, at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201.

The interface 270 may include various interface circuitry, such as, for example, and without limitation, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
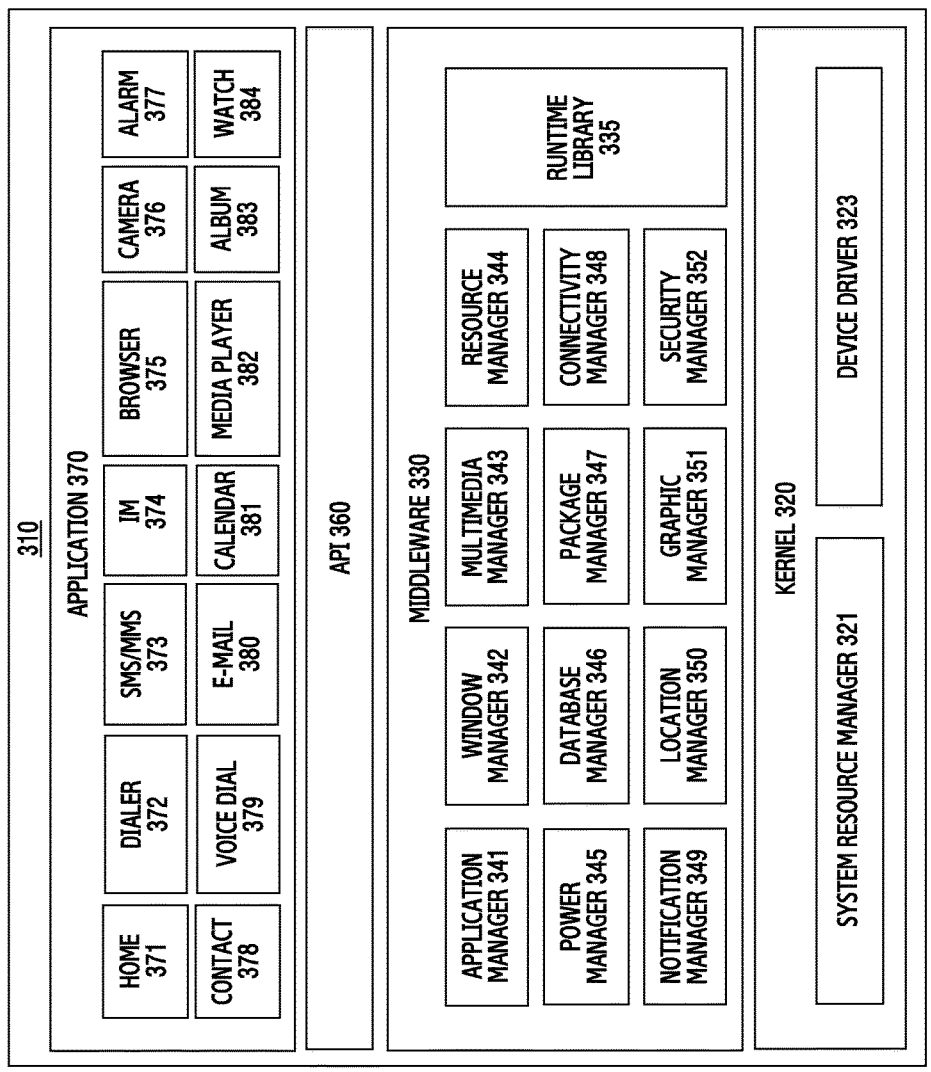
FIG. 3 is a block diagram illustrating an example program module according to an example embodiment of the present disclosure.

FIG. 3 is a block diagram illustrating an example program module according to an example embodiment of the present disclosure.

A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity, temperature, and/or power of the battery, and determine or provide power information for an operation of the electronic device using corresponding information among the capacity, temperature, and/or power of the battery. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/Multimedia Messaging System (MIMS) 373, an Instant Message (IM) 374, a browser 375, a camera 376, an alarm 377, a contact 378, a voice dial 379, an e-mail 380, a calendar 381, a media player 382, an album 383, a clock 384. Additionally, though not shown, the application 370 may include, for example, and without limitation, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4:
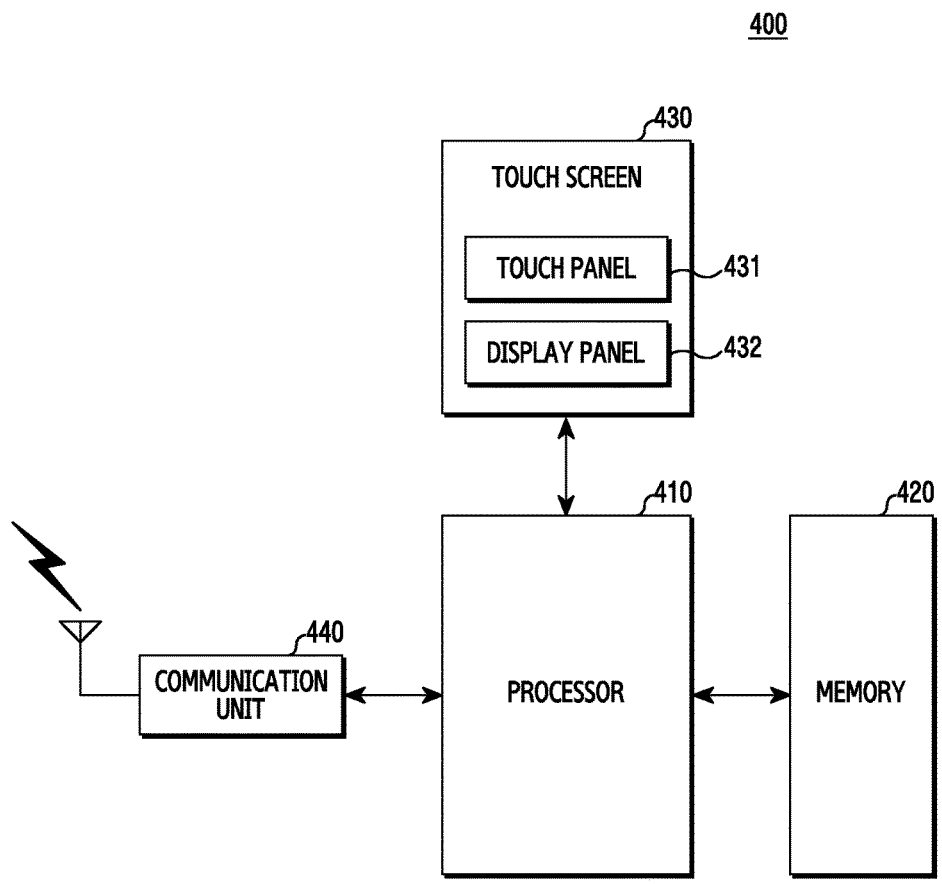
FIG. 4 is a block diagram illustrating an example electronic device according to an example embodiment of the present disclosure.

FIG. 4 is a block diagram illustrating an example electronic device according to an example embodiment of the present disclosure.

Referring to FIG. 4, the electronic device 400 according to an example embodiment of the present disclosure may include a processor (e.g., including processing circuitry) 410, a memory 420, a touch screen 430, and a communication unit (e.g., including communication circuitry) 440. The electronic device 400 may, for example, include the whole or part of the electronic device 101 illustrated in FIG. 1 or the electronic device 201 illustrated in FIG. 2.

The processor 410 (e.g., the processor 120 or the processor 210) may control the general operation of the electronic device 400. In other words, the processor 410 may control the respective constituent elements of the electronic device 400. For example, the processor 410 may receive commands and/or instructions from the memory 420, and control the respective constituent elements according to the received command and/or instructions, to perform various functions.

The processor 410 may include various processing circuitry, such as, for example, and without limitation, a dedicated processor, a Central Processing Unit (CPU), an Application Processor (AP), a Micro Control Unit (MCU), etc. The processor 410 may be formed as a single-core processor or a multi-core processor. The processor 410 may be a multi processor that consists of a plurality of processors. For example, the processor 410 may include an Application Processor (AP) and a Communication Processor (CP).

According to various example embodiments, the processor 410 may control an operating procedure of the electronic device 400. In detail, in case where a ratio of a display region of the touch screen 430 is different from a ratio of content (e.g., an image, a document, a video, a web page, etc.) and thus the content is displayed in a partial region among the display region, the processor 410 may provide various user interface (interaction) operations using a region (hereinafter, content non-display region) where content is not displayed. For example, if a preset touch input (e.g., a first touch input) occurs in the content non-display region, the processor 410 may split the display region into a set count (e.g., two), to provide a multiple window function.

In case where a preset touch input (e.g., a second touch input) occurs in a state where content is displayed in the whole display region, the processor 410 may move or scale down the content displayed in the whole display region, to generate a region where content is not displayed, and provide various user interface (interaction) operations using the content non-display region. A detailed description of this will be made later with reference to FIG. 5 and FIG. 6.

The memory 420 (e.g., the memory 130 or the memory 230) may store various programs for operating the electronic device 400, and store data that are generated during the execution of the various programs, downloaded data or the like. Also, the memory 420 may store various commands and/or instructions for operating the processor 410. The memory 420 may include at least any one of an internal memory or an external memory.

According to various example embodiments, the memory 420 may store a program for providing various user interface (interaction) operations using a region where content is not displayed. The program may include a routine of checking if displayed content is the content of a first ratio (for example, checking if the content is displayed in the whole display region), a routine of checking if a first touch input occurs in the content non-display region, a routine of executing a function corresponding to the first touch input, a routine of checking if a second touch input occurs in a state where the content of the first ratio is displayed, a routine of moving or scaling down the content of the first ratio in response to the second touch input to generate a void region (i.e., a content non-display region), a routine of restoring the moved or scaled-down content to the original when a first touch input is not detected within a preset time after the generation of the void region.

According to various example embodiments, the memory 420 may store a history (e.g., an execution time, an execution count, etc.) of applications that are executed during a constant period of time. Also, the memory 420 may store application information that is designated by a user or manufacturing company.

The touch screen 430 (e.g., the display 160 or the display 260) may provide an input function and an output function. For this, the touch screen 430 may include a touch panel 431 and a display panel 432. The touch panel 431 may provide the input function. For example, the touch panel 431 may sense (or recognize) the change of physical properties (e.g., capacitance, frequency, etc.) resulting from various touch inputs (e.g., a tap, a double tap, a touch, a touch and move, a multi touch, a pressure touch, etc.) that use an input tool such as the finger, a stylus, an electronic pen, etc., and forward this to the processor 410. The touch panel 431 may consist of a plurality of touch panels. For example, the touch panel 431 may include a capacitive overlay touch panel for recognizing a touch of the finger and an electromagnetic inductive touch panel for sensing a touch input of the electronic pen. Also, the touch panel 431 may include a pressure touch panel for sensing a pressure.

The display panel 432 may provide an output function. The display panel 432 may be, for example, formed as a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display panel 432 may be implemented to be flexible, transparent, or wearable.

The display panel 432 can, for example, display various contents (e.g., a text, an image, a video, an icon, a symbol and/or the like). The display panel 432 according to various example embodiments may have a first ratio (for instance, 19:9). According to some example embodiment, a display region of the display panel 432 may have the first ratio.

The display panel 432 may display the content (e.g., an image, a document, a video, etc.) of a first ratio or the content of a second ratio (for instance, 16:9). In case where the display panel 432 displays the content of the second ratio, the content may not be displayed in a partial region among a display region of the display panel 432. The display panel 432 and the content may have the same form. For example, the display panel 432 may be a rectangular form. Also, the content displayed in the display panel 432 may be the rectangular form, too. The display panel 432 according to various example embodiments of the present disclosure may display various screens that are illustrated in FIG. 7A to FIG. 11 described later.

The communication unit 440 (e.g., the communication interface 170 or the communication module 220) may perform a communication function. The communication unit 440 may perform wired or wireless communication. For example, the communication unit 440 may include various communication circuitry, such as, for example, and without limitation, a USB communication module, a WiFi communication module, a Bluetooth (BT) communication module, a Near Field Communication (NFC) module, a Global Positioning System (GPS) module, and the like. According to one example embodiment, at least some (e.g., two or more) of the WiFi communication module, the BT communication module, the NFC module or the GPS module may be included within one Integrated Circuit (IC) or IC package.

According to various example embodiments, the communication unit 440 may receive the content of a first ratio or the content of a second ratio from an external device (e.g., a web server, a cloud server, a streaming server, other electronic devices, etc.) under the control of the processor 410 in the electronic device 400.

On the other hand, though not illustrated in FIG. 4, the electronic device 400 may not include some of the explained elements. The electronic device 400 may further include various elements (e.g., a sensor module, an audio processing module, a camera module, a digital broadcasting module, etc.) of a level that is equivalent to those of the explained above.

An electronic device (e.g., the electronic device 101, electronic device 201, or the electronic device 400) according to various example embodiments of the present disclosure may comprise: a touch screen (e.g., the display 160, the display 260, or the touch screen 430) having a display region of a first ratio; and a processor (e.g., the processor 120, the processor 210, or the processor 410) operatively coupled with the touch screen, and configured to perform a function in response to a preset first touch input that occurs on another region where content is not displayed of the display region in a state where the content of a second ratio is displayed on a partial region of the display region.

According to various embodiments, the display region and the content may have the same form.

According to various embodiments, the first ratio may be 19:9, and the second ratio may be 16:9.

According to various embodiments, the preset first touch input may comprise a touch and move that starts from the another region and ends in the partial region.

According to various embodiments, the set function may comprise a multiple window function of equally splitting the display region into a set count.

According to various embodiments, the processor may be further configured to determine a window in which the content is to be displayed, on the basis of a movement direction of the first touch input when the multiple window function is executed.

According to various embodiments, in case where the first touch input is detected in a state where an execution screen of an application having the second ratio and not supporting a multiple window is being displayed, the processor may be further configured to control the touch screen to display, in the another region, an error message of notifying that the electronic device cannot perform the multiple window function.

According to various embodiments, in case where the first touch input is detected in a state where an execution screen of an application having the second ratio and not supporting a multiple window is displayed, the processor may be further configured to unequally split the display region such that a size and ratio of the execution screen are maintained, and to display an error message in a split region where the execution screen is not displayed.

According to various embodiments, in response to a preset second touch input that is detected in a state where the content of a first ratio is displayed in the entire display region, the processor may be further configured to move the content of the first ratio, and to control the touch screen to generate a region where content is not displayed.

Figure 5:
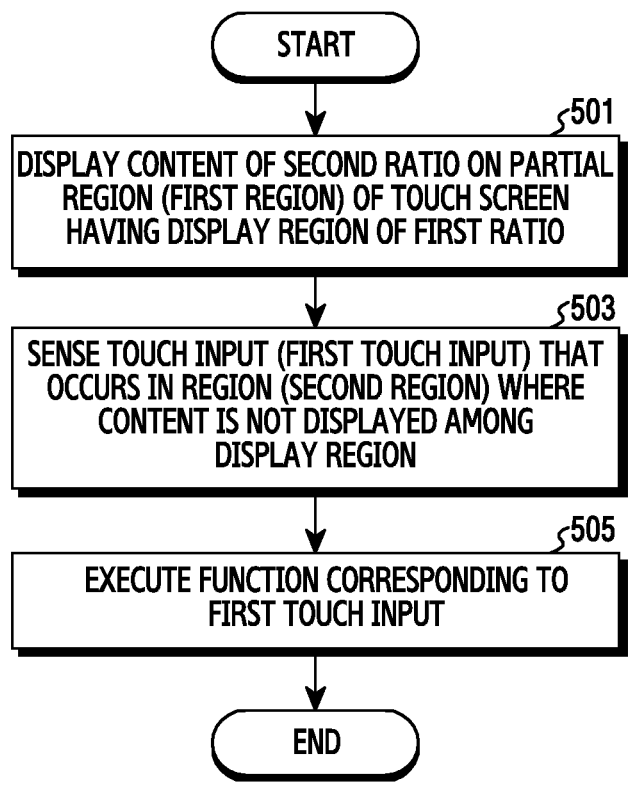
FIG. 5 is a flowchart illustrating an example method for operating of an electronic device according to an example embodiment of the present disclosure.

FIG. 5 is a flowchart illustrating an example method for operating of an electronic device according to an example embodiment of the present disclosure.

Referring to FIG. 5, according to various example embodiments of the present disclosure, in operation 501, the electronic device (e.g., the processor 120 of the electronic device 101, the processor 210 of the electronic device 201, or the processor 410 of the electronic device 400.) may display the content of a second ratio (e.g., 16:9, 16:10, 4:3, etc.) on a partial region (hereinafter, a first region) of a touch screen (e.g., the display 160 of the electronic device 101, the display 260 of the electronic device 201, or the touch screen 430 of the electronic device 400) having a display region of a first ratio (e.g., 19:9). The content may be displayed only in the first region of the display region because at least one of a first direction (e.g., horizontal) and second direction (e.g., vertical) of the display region of the touch screen is greater than at least one of a first direction and second direction of the content.

In operation 503, the electronic device according to an example embodiment of the present disclosure may sense a preset touch input (hereinafter, a first touch input) that occurs in a content non-display region (hereinafter, a second region) of the display region. The first touch input may include at least one of a touch and move, a gesture drawing a specific shape, a double touch, a multi touch, a long touch, and a pressure touch. The multi touch may include an operation of releasing after touch inputting at mutually different at least two points or an operation (e.g., a pinch in, a pinch out, a drag, etc.) of moving after touch inputting mutually different at least two points. For example, the multi touch may be a touch input of touching both-side regions in which the content is not displayed. In other words, in case where content is displayed at the center of the display region and content is not displayed in regions of both sides (e.g., right and left sides, or up and down sides) of the displayed content, a user may touch the regions of the both sides of the displayed content.

In operation 505, the electronic device according to an example embodiment of the present disclosure may execute a function corresponding to the first touch input. For example, the electronic device may execute a multiple window function. A description of the execution of the multiple window function will be made later with reference to FIG. 7A to FIG. 10. However, example embodiments of the present disclosure are not limited to executing the multiple window, and may execute various functions that the electronic device supports.

Figure 6:
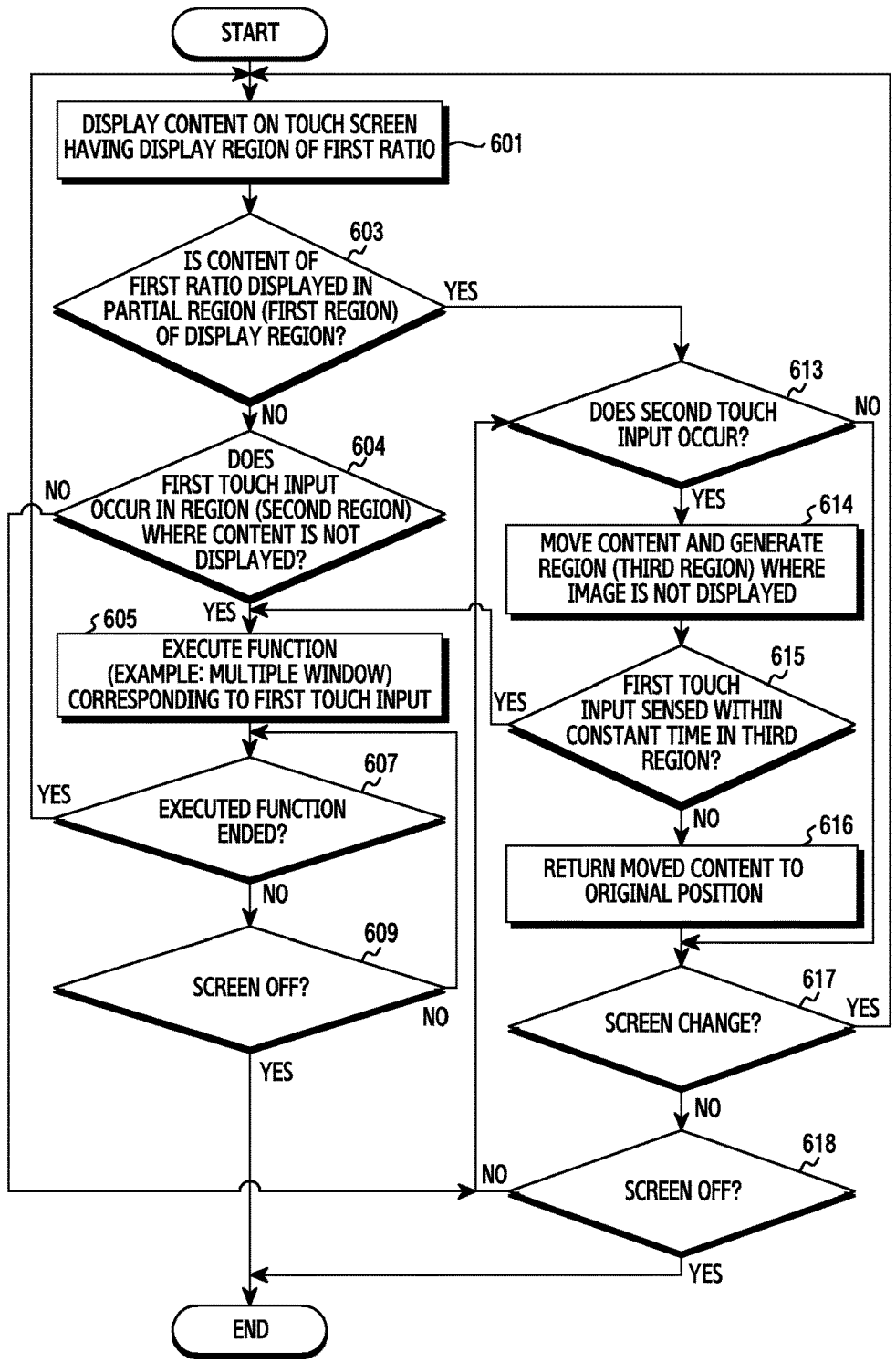
FIG. 6 is a flowchart illustrating an example method for operating of an electronic device in more detail according to an example embodiment of the present disclosure.

FIG. 6 is a flowchart illustrating an example method for operating of an electronic device in more detail according to an example embodiment of the present disclosure.

Referring to FIG. 6, in operation 601, the electronic device (e.g., the processor 120 of the electronic device 101, the processor 210 of the electronic device 201, or the processor 410 of the electronic device 400) according to an example embodiment of the present disclosure may display content on a partial region (hereinafter, a first region) of a touch screen (e.g., the display 160 of the electronic device 101, the display 260 of the electronic device 201, or the touch screen 430 of the electronic device 400) having a display region of a first ratio (e.g., 19:9). The content may have the same ratio or different ratio from the display region. For example, the content may have the same first ratio (19:9) as the display region, or have a different ratio (e.g., 16:9, 16:10, 4:3, etc.).

In operation 603, the electronic device according to an example embodiment of the present disclosure may determine whether the displayed content is the content of a first ratio that is displayed in the first region. In case where the content is not the content of the first ratio in operation 603, the electronic device may proceed to operation 604.

In operation 604, the electronic device according to an example embodiment of the present disclosure may determine whether a preset first touch input occurs in a content non-display region (hereinafter, a second region). In case where the first touch input does not occur, the electronic device may proceed to operation 617 described later. On the other hand, in case where the first touch input occurs, the electronic device may proceed to operation 605, to execute a function corresponding to the first touch input. For example, the electronic device may execute a multiple window function. A detailed description of this will be made with reference to example diagrams of FIG. 7A to FIG. 8B.

In operation 607, the electronic device according to an example embodiment of the present disclosure may check if the end of the executed function is requested. In case where the end of the function is requested, the electronic device may return to operation 601 to repeat the aforementioned operations. On the other hand, in case where the end of the function is not requested, the electronic device may proceed to operation 609, to check if a screen is off. In case where the screen is not off, the electronic device may return to operation 607. On the other hand, in case where the screen is off, the electronic device may terminate the operating procedure according to an example embodiment of the present disclosure.

On the other hand, in case where the displayed content is the content of the first ratio in operation 603, in other words, in case where the content is displayed in the whole display region, the electronic device may proceed to operation 613, to determine whether a set second touch input occurs in the whole display region. The second touch input may be a touch and move gesture of moving in a specific direction after touching an edge of the display region. However, the second touch input according to an example embodiment of the present disclosure is not limited to the touch and move gesture, and may be set as various gestures in accordance with an intention of a user or manufacturing company.

In case where the second touch input does not occur in operation 613, the electronic device may jump to operation 617 described later. On the other hand, in case where the second touch input occurs in operation 613, the electronic device may proceed to operation 614 to move the displayed content of the first ratio, and control the touch screen such that a content non-display region (e.g., a third region) is generated. Here, the term "third region" is for distinguishing from a void region (e.g., a second region) of when the content of a second ratio is displayed. The third region may have the same role as the second region.

In operation 615, the electronic device according to one example embodiment of the present disclosure may check if a first touch input occurs in the third region within a preset time. In case where the first touch input occurs within the preset time (e.g., 3 seconds) in operation 615, the electronic device may return to operation 605 to perform the aforementioned operations. On the other hand, in case where the first touch input is not detected within the preset time in operation 615, the electronic device may proceed to operation 616 to return the moved content to the original position.

In operation 617, the electronic device according to an example embodiment of the present disclosure may check if the screen is changed. In case where the screen is changed in operation 617, the electronic device may return to operation 601 to repeat the aforementioned operations. In contrast, in case where the screen is not changed in operation 617, the electronic device may proceed to operation 618 to check if the screen is off. In case where the screen is not off in operation 618, the electronic device may return to operation 613. On the other hand, in case where the screen is off in operation 618, the electronic device may terminate the operating procedure according to an example embodiment of the present disclosure.

According to various example embodiments, a method for operating of an electronic device having a display region of a first ratio may comprise: displaying a content of a second ratio on a partial region among the display region of the first ratio; determining whether a preset first touch input occurs in another region where content is not displayed among the display region; and performing a set function in response to the first touch input.

According to various embodiments, the display region and the content may have the same form.

According to various embodiments, the first ratio may be 19:9, and the second ratio may be 16:9.

According to various embodiments, the performing of the set function may comprise performing a multiple window function of equally splitting the display region into a set count.

According to various embodiments, the performing of the multiple window function may comprise determining a window in which the content is to be displayed, on the basis of a movement direction of the first touch input.

According to various embodiments, the performing of the multiple window function may comprise displaying, in the another region, an error message of notifying that the electronic device cannot perform the multiple window function, in case where the first touch input is detected in a state where an execution screen of an application having the second ratio and not supporting a multiple window is being displayed.

According to various embodiments, the performing of the multiple window function may comprise: in case where the first touch input is detected in a state where an execution screen of an application having the second ratio and not supporting a multiple window is displayed, unequally splitting the display region such that a size and ratio of the execution screen are maintained; and displaying an error message in a split region where the execution screen is not displayed.

According to various embodiments, the method may further comprise: determining whether a preset second touch input is detected in a state where the content of a first ratio is displayed in the entire display region; and in response to the second touch input, moving the content of the first ratio and generating a region where content is not displayed.

According to various embodiments, the method may further comprise: determining whether the first touch input occurs within a preset time, after generating the region where content is not displayed; and in case where the first touch input is not detected within the preset time, returning the moved content to the original position.

According to various embodiments, the method may further comprise: displaying content in the display region; determining whether the displayed content has the first ratio; and when the displayed content has the first ratio, determining whether the second touch input is detected, and when the displayed content does not have the first ratio, determining whether the first touch input occurs.

FIGS. 7A, 7B, 8A and FIG. 8B are diagrams illustrating examples in which an electronic device executes a multiple window in a state where the content of a second ratio is displayed according to an example embodiment of the present disclosure.

Prior to detailed description, unlike the conventional electronic devices, an electronic device according to an example embodiment of the present disclosure may not include a physical key (e.g., a touch key, a button key, etc.) in a front surface where a touch screen is located. This is for increasing the size of a display without increasing the size of an external form of the electronic device. Owing to this, a ratio (e.g., 19:9) of a touch screen of the electronic device according to one example embodiment of the present disclosure may be different from a ratio (e.g., 16:9) of a touch screen of the conventional electronic device. Such the electronic device according to an example embodiment of the present disclosure may use a soft key in place of the physical key.

Figure 7A:
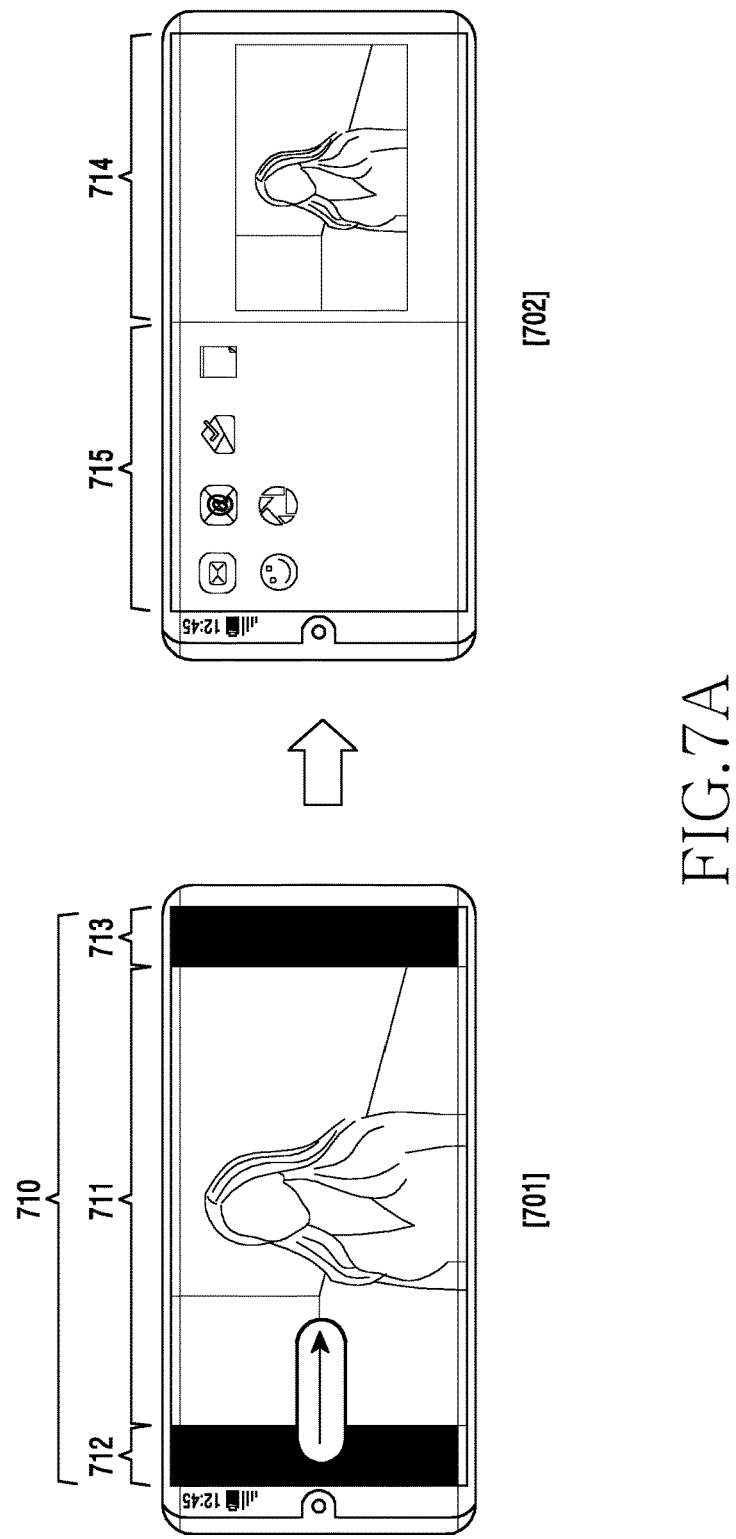
FIG. 7A is a diagram illustrating an example in which an electronic device executes a multiple window using a void region (i.e., a second region) in a state where the content of a second ratio is displayed according to an example embodiment of the present disclosure.
Figure 7B:
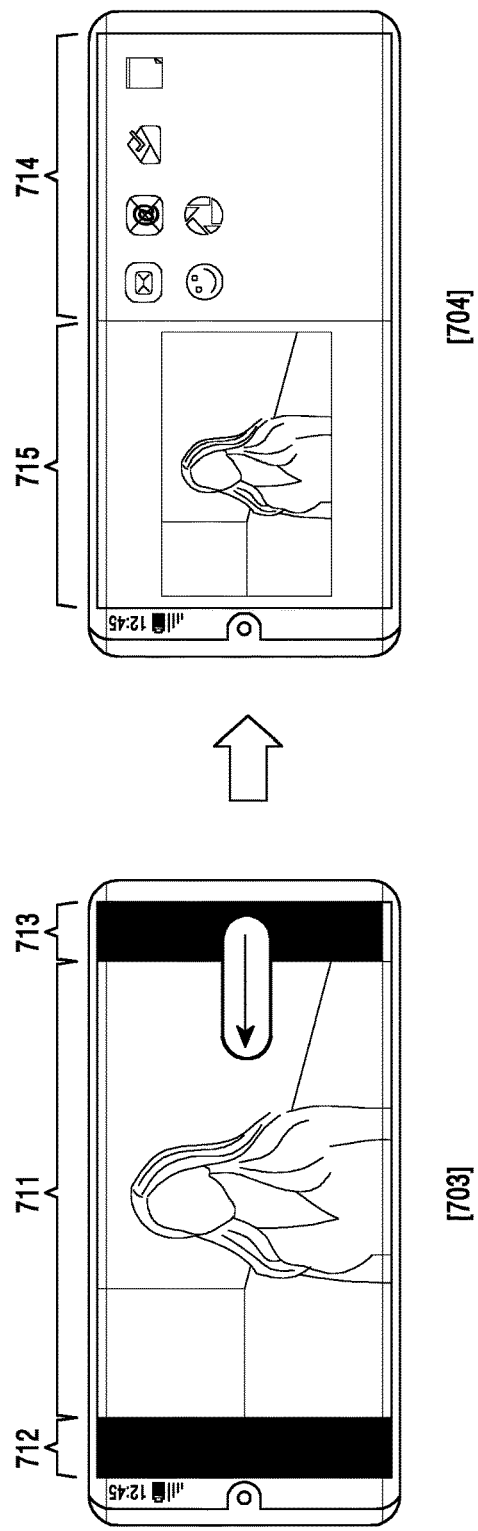
FIG. 7B is a diagram illustrating an example in which an electronic device executes a multiple window using a void region (i.e., a second region) in a state where the content of a second ratio is displayed according to an example embodiment of the present disclosure.

Referring to FIG. 7A and FIG. 7B, the electronic device according to various example embodiments of the present disclosure may display the content (e.g., a video) of a second ratio, on a touch screen having a display region 710 of a first ratio. Because the ratio of the display region 710 and the ratio of the content are different from each other, the electronic device may display the content only in a partial region among the display region 710. For example, as illustrated in a FIG. 701, the electronic device may display content in a partial region (hereinafter, a first region) 711 of the display region 710, and may not display the content in other regions (hereinafter, second regions) 712 and 713 of the display region 710. On the other hand, the first region 711 may be called an activation region, an App region, an operation region, etc., and the second region 712 or 713 may be called an inactivation region, an extra region, a void region, etc.

In case where a preset first touch input occurring in one of the second regions 712 and 713 is detected, the electronic device may execute a set function. The first touch input may be a touch and move (e.g., a drag, a swipe) of moving in direction going from the second regions 712 and 713 to the first region 711. However, an example embodiment of the present disclosure is not limited to this.

For example, as illustrated in 701 and 702 of FIG. 7A, in case where a touch and move is detected in direction going from the left second region 712 to the first region 711, the electronic device may split the display region 710 into two, and scale down and display a content screen in a first split region 714, and display an App list screen in a second split region 715. At this time, since the electronic device is positioned in landscape orientation, the electronic device may equally split the screen right and left. In case where a specific icon is selected from the App list screen, an execution screen of a corresponding application may be displayed in the second split region 715.

As illustrated in 703 and 704 of FIG. 7B, in case where a touch and move is detected in direction going from the right second region 713 to the first region 711, the electronic device may equally split the display region 710 into two, and display an App list screen in the first split region 714, and scale down and display a content screen in the second split region 715. In case where a specific icon is selected from the App list screen, an execution screen of a corresponding application may be displayed in the first split region 714.

As above, the electronic device according to an example embodiment of the present disclosure may decide a split region where a content screen is to be displayed, based on touch and move direction. For example, if the touch and move direction is the right, the electronic device may display a content screen in a right split region among split regions and, if the touch and move direction is the left, the electronic device may display the content screen in a left split region among the split regions.

On the other hand, content is not displayed in partial regions of upper and lower ends of the first split region 714 of the FIG. 702 and the second split region 715 of the FIG. 704. In case where the first touch input occurs in the partial regions of the upper and lower ends where the content is not displayed, the electronic device may execute a set function. For example, the electronic device may split the first split region 714 of the FIG. 702 up and down. Or, the electronic device may split the second split region 715 of the FIG. 704 up and down.

Figure 8A:
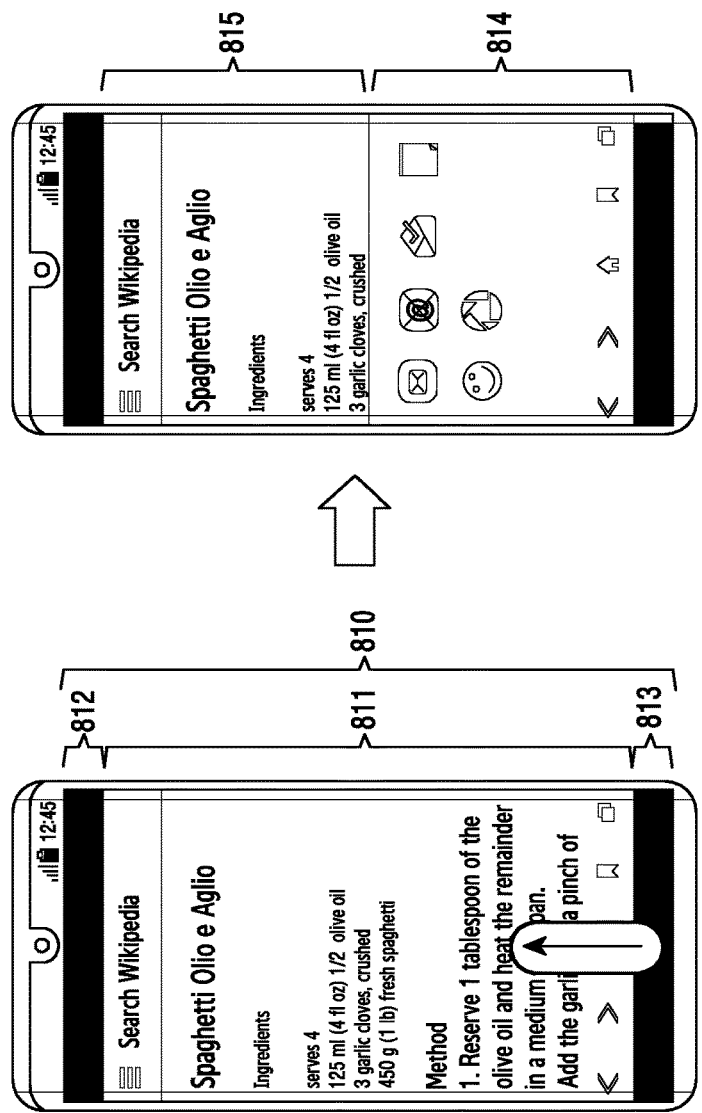
FIG. 8A is a diagram illustrating an example in which an electronic device executes a multiple window using a void region (i.e., a second region) in a state where the content of a second ratio is displayed according to an example embodiment of the present disclosure.
Figure 8B:
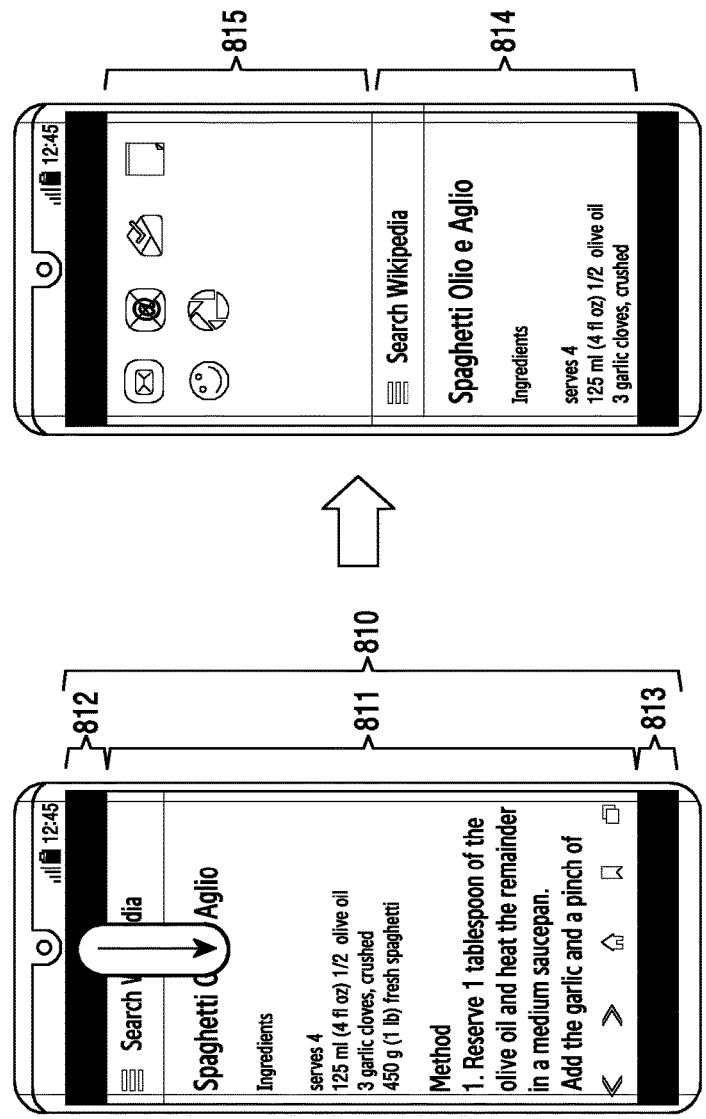
FIG. 8B is a diagram illustrating an example in which an electronic device executes a multiple window using a void region (i.e., a second region) in a state where the content of a second ratio is displayed according to an example embodiment of the present disclosure.

Referring to FIG. 8A and FIG. 8B, an electronic device according to an example embodiment of the present disclosure may be positioned in portrait orientation. The electronic device may display the content (e.g., a web page) of a second ratio, on a touch screen having a display region 810 of a first ratio. Because the ratio of the display region 810 and the ratio of the content are different from each other, the electronic device may display the content only in a partial region (e.g., a first region) 811 of the display region 810. At this time, the content may not be displayed in second regions 812 and 813 located at upper and lower ends of the first region 811.

In case where a touch and move is detected in direction going from the second regions 812 and 813 to the first region 811, the electronic device may equally split the display region 810 into two, and display an App list screen or a content screen in a first split region 814, and display the content screen or the App list screen in a second split region 815. At this time, in FIG. 8A and FIG. 8B, the content screen may not be scaled down, unlike FIG. 7A and FIG. 7B.

FIG. 8A and FIG. 8B are similar with FIG. 7A and FIG. 7B in that only the orientation of the electronic device is different. Accordingly, a more detailed description thereof is omitted.

As mentioned above, the electronic device may split a display region into a preset count (e.g., two) at the time of a first touch input. For example, the electronic device may equally split the display region as many as the preset count. At this time, current content may be displayed in one region among split regions. The current content may be scaled down in whole size to maintain its screen ratio, or may maintain its current size. Meanwhile, an App list screen displaying icons of applications may be displayed in another region among the split regions. For example, icons of concurrently executable applications, recently used applications, frequently used applications, and applications designated by a user may be displayed in the another region among the split regions.

According to some example embodiment, execution screens of the latest executed application, the most frequently used application or an application designated by a user may be displayed in the another region. A more detailed description of this will be made with reference to FIG. 10.

Figure 9:
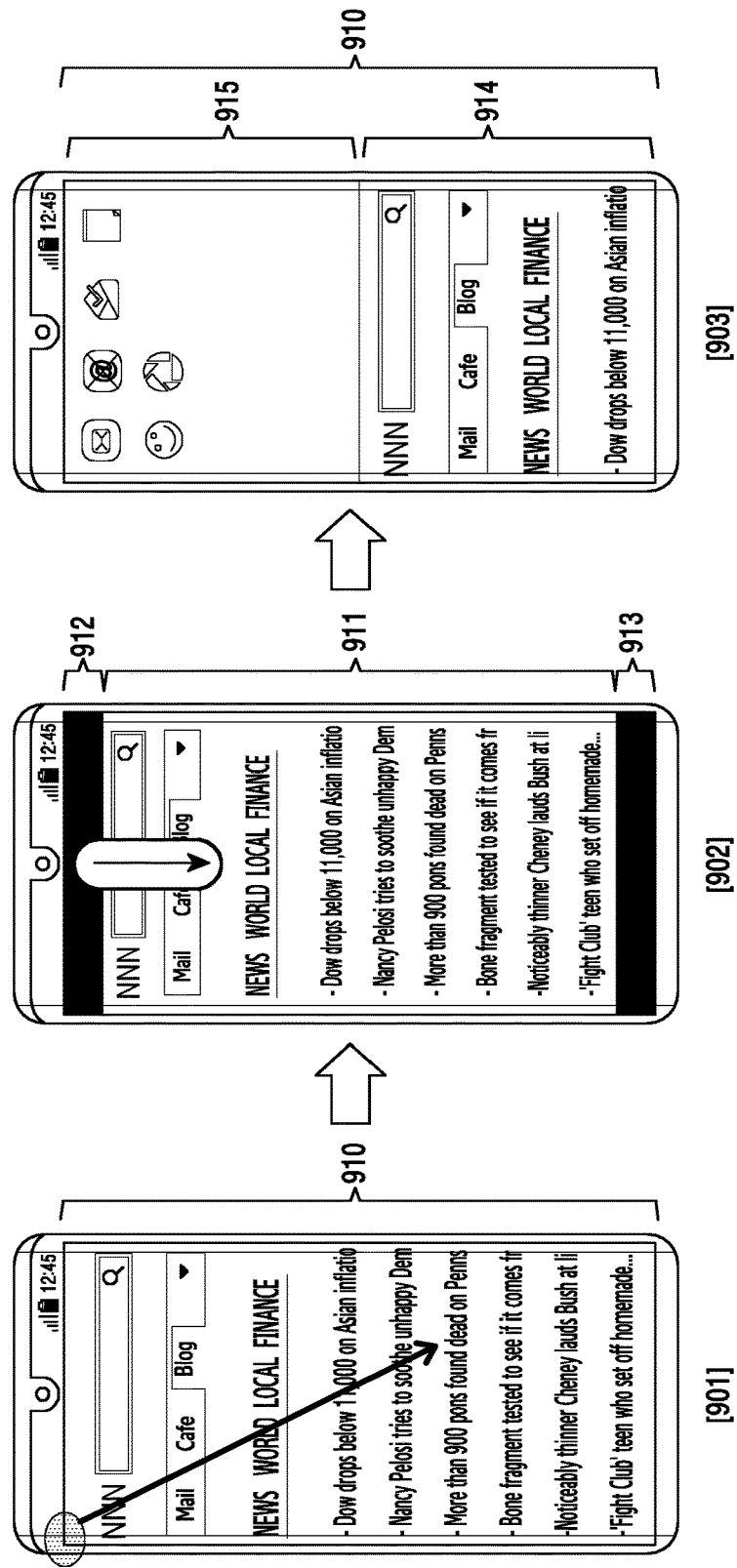
FIG. 9 is a diagram illustrating an example in which an electronic device executes a multiple window in a state where the content of a first ratio is displayed according to an example embodiment of the present disclosure.

FIG. 9 is a diagram illustrating an example in which an electronic device executes a multiple window in a state where the content of a first ratio is displayed according to an example embodiment of the present disclosure.

Referring to FIG. 9, as illustrated in a 901, the electronic device according to an example embodiment of the present disclosure may scale up the content of a second ratio to a first ratio and display the content in the whole display region 910. The electronic device may display the content of the first ratio in the whole display region 910.

In case where the electronic device cannot provide an interaction using a second region because a content non-display region does not exist as in the FIG. 901, the electronic device may check if a preset second touch input is detected. The second touch input may be a touch and move gesture of moving from a one-side end (e.g., a left upper end corner) of the display region 910 to a specific direction (i.e., a right lower end). However, the present disclosure is not limited to this.

In case where the second touch input is detected, the electronic device may change the content to the original size, i.e., the second ratio and display the changed content as in a FIG. 902. As the content is changed to the original size, second regions 912 and 913 may be shown at upper and lower ends of the display region 910. According to some example embodiment, in response to the second touch input, the electronic device may move the content of the first ratio such that a content non-display region (i.e., a third region) is generated.

The electronic device may provide an interaction that uses the second regions 912 and 913 or the third region (not shown). For example, as illustrated in FIGS. 902 and 903, in case where a first touch input is detected in the second region 912 located at the upper end, the electronic device may split the display region 910, and display a content screen in a first split region 914, and display an App list screen in a second split region 915.

Figure 10:
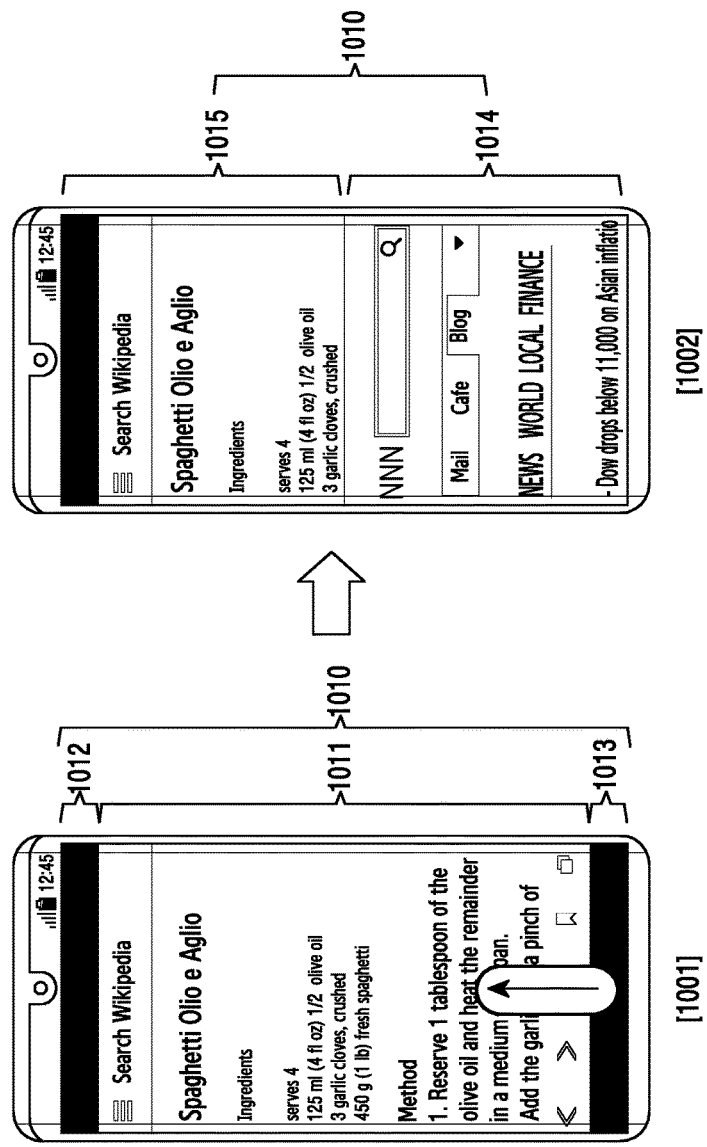
FIG. 10 is a diagram illustrating an example in which an electronic device executes a multiple window using a void region (i.e., a second region) according to an example embodiment of the present disclosure.

FIG. 10 is a diagram illustrating an example in which an electronic device executes a multiple window using a void region (i.e., a second region) according to an example embodiment of the present disclosure.

Referring to FIG. 10, as illustrated in 1001, the electronic device according to one example embodiment of the present disclosure may display the content of a second ratio on a first region 1011 of a display region 1010. At this time, second regions 1012 and 1013 where the content is not displayed exist at upper and lower ends of the first region 1011.

In case where a first touch input is detected in the second region 1013 located at a lower end of the first region 1011, the electronic device may split the display region 1010 up and down as illustrated in 1002. The electronic device may display a content screen in a second split region 1015, and display an execution screen of the latest executed application (e.g., a web browser) in a first split region 1014. According to some example embodiment, the electronic device may display, in the first split region 1014, an execution screen of an application that is most used during a constant period of time, or an execution screen of an application designated by a user.

On the other hand, in case where the first touch input occurs in the second region 1012 located at the upper end in the FIG. 1001, the electronic device may display a content screen in the first split region 1014, and display, in the second split region 1015, an execution screen of the latest executed application, an execution screen of an application that is most used during a constant period of time, or an execution of an application designated by a user.

Figure 11:
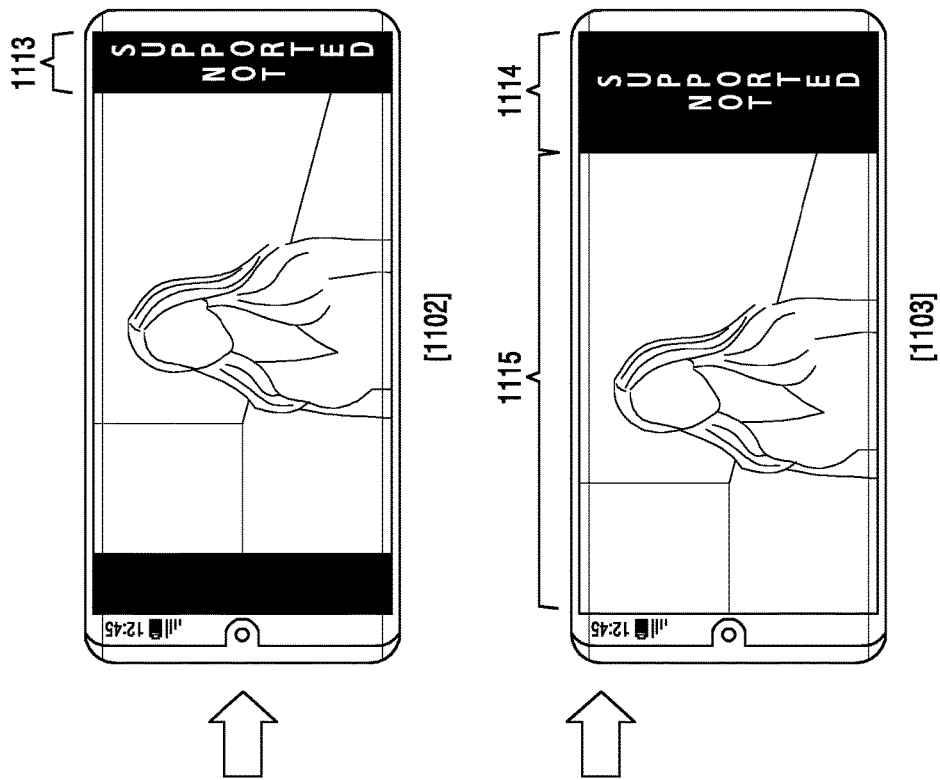
FIG. 11 is a diagram illustrating an example in which an electronic device executes a multiple window using a void region (i.e., a second region) according to an example embodiment of the present disclosure.
Figure 11:
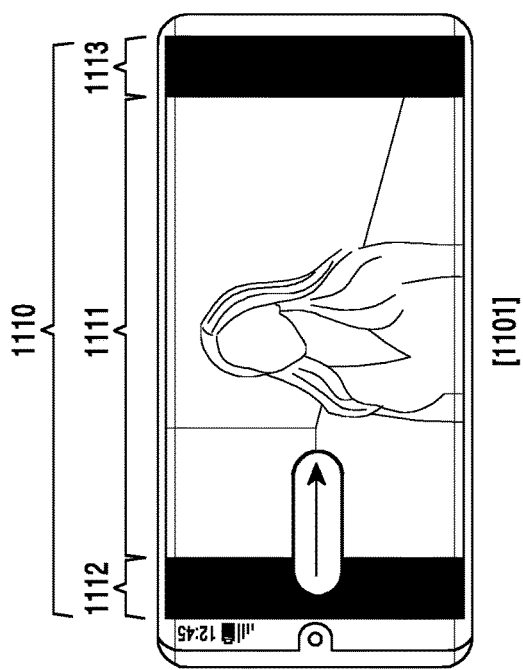

FIG. 11 is a diagram illustrating an example in which an electronic device executes a multiple window using a void region (i.e., a second region) according to an example embodiment of the present disclosure.

Referring to FIG. 11, the electronic device according to an example embodiment of the present disclosure may, as illustrated in 1101, display an execution screen of an application, which has a second ratio and does not support a multiple window, in a partial region 1111 of a display region 1110. In a state where the execution screen of the application not supporting the multiple window is displayed, in case where a first touch input is detected in a second region 1112 of the display region 1110, the electronic device may notify a user that it does not support the multiple window. For example, the electronic device may, as illustrated in a FIG. 1102, display an error message such as "not supported" in a second region 1113.

According to another example embodiment, the electronic device may, as illustrated in 1103, unequally split the display region 1110 into a first split region 1114 and a second split region 1115. At this time, the second split region 1115 may have the same size as an execution screen of content, and the first split region 1114 may have a size of a sum of the second regions 1112 and 1113. The electronic device may display an error message such as "not supported" in the first split region 1114.

On the other hand, if the first touch input occurs in the second region 1113, the electronic device may display the error message in the second region 1112. The electronic device may unequally split the display region 1110 into the first split region 1114 and the second split region 1115 such that the first split region 1114 has the same size as a content screen and the second split region 1115 has a size of a sum of the second regions 1112 and 1113, and may display the content screen in the first split region 1114 and display the error message in the second split region 1115. The error message, for example, may be displayed on an opposite region of the second region that the touch input occurs.

The aforementioned electronic device using not the physical key but the soft key according to various example embodiments of the present disclosure may easily execute various functions through simple handling that uses a region where content is not displayed, without needing to load the soft key so as to execute a specific function in a state where the content is displayed.

Meanwhile, generally, in case where a touch input occurs on a screen where content is displayed, a function associated with the displayed content is executed. On the other hand, as using a region where content is not displayed, the electronic device according to one example embodiment of the present disclosure may provide various interactions irrespective of the displayed content.

Various example embodiments of the present disclosure may easily execute various functions using a region where content is not displayed among a display region. Accordingly, the various example embodiments of the present disclosure may enhance a user's convenience.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

According to various example embodiments, a computer-readable recording medium may store at least one instruction. The at least one instruction may be set for at least one processor to perform at least one operation when the at least one instruction is executed by the at least one processor. The at least one operation may comprise: displaying the content of a second ratio on a partial region among a display region of a first ratio; determining whether a preset first touch input occurs in another region where content is not displayed among the display region; and performing a set function in response to the first touch input.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The example embodiments of the present disclosure disclosed herein and illustrated in the drawings are merely specific examples presented in order to easily describe technical details of the present disclosure and to aid in understanding of the present disclosure, and are not intended to limit the scope of the present disclosure. Therefore, it should be understood that, in addition to the example embodiments disclosed herein, all modifications and changes or modified and changed forms derived from the technical idea of the present disclosure fall within the scope of the present disclosure.

What is claimed is:
1. An electronic device comprising:
a touch screen having a display region of a first ratio; and
a processor operatively coupled with the touch screen, and configured to:
identify a first content having a second ratio distinct from the first ratio;
display, in response to the identifying of the first content, the first content in the touch screen with at least one of margin area to maintain aspect ratio of the first content as the second ratio;
identify, while displaying the first content, a user input that is started in the at least one of margin area and is ended in the displayed first content; and
display, in response to the identifying of the user input, a second content distinct from the first content while displaying the first content, wherein the first content and the second content are respectively displayed in different portions in the display region.

2. The electronic device of claim 1, wherein the processor is configured to display, while displaying the second content, the first content in the touch screen according to the second ratio.

3. The electronic device of claim 1, wherein the first ratio is 19:9, and the second ratio is 16:9.

4. The electronic device of claim 1, wherein the user input corresponds to a drag gesture on the touch screen that is started in the at least one of the margin area and is ended in the displayed first content.

5. The electronic device of claim 1, wherein the processor is further configured to display the second content and the first content by set function comprises a multiple window function configured to equally split the display region into predetermined regions.

6. The electronic device of claim 5, wherein the processor is further configured to determine a window in which the first content is to be displayed based on a movement direction of the user input when the second content is displayed.

7. The electronic device of claim 5, wherein, where the user input is detected in a state where an application providing the first content does not supporting a multiple window function, the processor is further configured to control the touch screen to display an error message notifying that the electronic device cannot perform the multiple window function.

8. The electronic device of claim 5, wherein, where the user input is detected in a state where an application providing the first content does not support a multiple window function, and the processor is further configured to unequally split the display region to maintain a size and ratio of the first content, and to display an error message in a split region where the first content is not displayed.

9. The electronic device of claim 1, wherein the displaying of the second content is restricted in a case of the identifying of the first content having an aspect ratio corresponding to the first ratio.

10. A method for operating of an electronic device having a display region of a first ratio, the method comprising:
identifying a first content having a second ratio distinct from the first ratio;
displaying, in response to the identifying of the first content, the first content in the display region with at least one margin area to maintain aspect ratio of the first content as the second ratio;
identifying, while displaying the first content, a user input that is started in the at least one margin area and is ended in the displayed first content; and
displaying, in response to the identifying the user input, a second content distinct from the first content while displaying the first content, where the first content and the second content are respectively displayed in different portions in the display region.

11. The method of claim 10, further comprising displaying, while displaying the second content, the first content in the display region according to the second ratio.

12. The method of claim 10, wherein the first ratio is 19:9, and the second ratio is 16:9.

13. The method of claim 10, wherein the displaying the second content further comprises displaying the second content and the first content by equally splitting the display region.

14. The method of claim 13, wherein the displaying the second content comprises determining a window in which the first content is to be displayed, on the basis of a movement direction of the user input when the second content is displayed.

15. The method of claim 13, further comprising displaying an error message notifying that the electronic device cannot display the second content, in a case where the user input is detected in a state where an application providing the first content does not support a multiple window function.

16. The method of claim 13, wherein the performing of the multiple window function comprises:
  where the user input is detected in a state where an application providing the first content does not support a multiple window function, unequally splitting the display region to maintain a ratio of the first content as the second ratio; and
  displaying an error message in a split region where the first content is not displayed.

17. A non-transitory computer-readable recording medium that stores at least one instruction,
  wherein the at least one instruction when executed by at least one processor causes an electronic device to perform at least one operation for an electronic device having a display region of a first ratio, the at least one operation comprising:
  identifying a first content having a second ratio distinct from the first ratio;
  displaying, in response to the identifying of the first content, the first content in a display region of the first ratio with at least one margin area to maintain aspect ratio of the first content as the second ratio;
  identifying, while displaying the first content, a user input that is started in the at least one margin area and is ended in the displayed first content; and
  displaying, in response to the identifying the user input, a second content distinct from the first content while displaying the first content, where the first content and the second content are respectively displayed in different portions in the display region.

* * * * *